(12) United States Patent
Meskens (10) Patent No.: US 8,457,547 B2
(45) Date of Patent: Jun. 4, 2013

(54) MAGNETIC INDUCTION SIGNAL REPEATER (75) Inventor: Werner Meskens, Opwijk (BE)

(73) Assignee: Cochlear Limited, Macquarie University, NSW (AU)

( * ) Notice: Subject to any disclaimer, the term of this patent is extended or adjusted under 35 U.S.C. 154(b) by 388 days.

(21) Appl. No.: 12/990,041

(22) PCT Filed: Apr. 28, 2009

(86) PCT No.: PCT/AU2009/000523
§ 371 (c)(1),
(2), (4) Date: Oct. 28, 2010

(87) PCT Pub. No.: WO2009/132383
PCT Pub. Date: Nov. 5, 2009

(65) Prior Publication Data
US 2011/0043051 A1 Feb. 24, 2011

(30) Foreign Application Priority Data
Apr. 28, 2008 (AU) ................. 2008902082

(51) Int. Cl.
*H04Q 7/32* (2006.01)

(52) U.S. Cl.
USPC .......... 455/7; 455/11.1; 455/14; 455/23; 455/426.1; 455/403; 600/407; 600/410; 600/415; 600/422; 600/423; 370/310; 370/315; 370/316

(58) Field of Classification Search
USPC ............ 455/7, 11.1, 12.1, 14, 23, 426.1, 455/426.2, 550.1, 403, 41.1, 41.2, 41.3, 455/423–425; 370/310, 315, 316, 319; 600/407, 600/410, 415, 422, 423; 375/211
See application file for complete search history.

(56) References Cited

U.S. PATENT DOCUMENTS

| 4,747,158 | A | 5/1988 | Goldberg et al. |
| 6,459,882 | B1 | 10/2002 | Palermo et al. |
| 7,212,866 | B1 | 5/2007 | Griffith |
| 8,259,429 | B2 * | 9/2012 | Lee ............................ 361/113 |
| 2004/0015071 | A1 * | 1/2004 | Komura et al. ............. 600/410 |
| 2004/0199212 | A1 | 10/2004 | Fischell et al. |

OTHER PUBLICATIONS

Patent Abstrats of Japan, Kokusai Electric Co., Ltd, JP 07240706 A, Sep. 12, 1995.
International Search Report, PCT/AU2009/000523, mailed Jul. 1, 2009.
Written Opinion, PCT/AU2009/000523, mailed Jul. 1, 2009.

* cited by examiner

*Primary Examiner* — Keith Ferguson
(74) *Attorney, Agent, or Firm* — Kilpatrick, Townsend & Stockton, LLP.

(57) ABSTRACT

A magnetic induction (MI) repeater includes first and second coils configured to have the same resonance frequency and to be substantially isolated from one another, and an amplifier connected to the first and second coils and configured to receive a signal induced in the first coil by a first magnetic field and output, via the second coil, a second magnetic field based on the signal, wherein the second magnetic field is amplified relative to the first magnetic field.

20 Claims, 7 Drawing Sheets

MAGNETIC INDUCTION SIGNAL REPEATER

CROSS-REFERENCE TO RELATED APPLICATIONS

This application is a National Stage Application of International Patent Application No. PCT/AU2009/000523, filed Apr. 28, 2009, which claims the benefit of Australian Provisional Application No. 2008902082, filed Apr. 28, 2008, both of which are hereby incorporated by reference herein.

BACKGROUND

1. Field of the Invention

The present invention relates to magnetic induction (MI) radio systems, and particularly to an MI repeater.

2. Related Art

Some medical devices, for example cochlear implants and hearing aids, use magnetic induction (MI) radio to communicate between a device and various associated peripheral devices. For example, it may be used to transmit data to and from a cochlear implant or hearing aid, or to communicate with a remote control. Very often the device itself has limited power, which limits the range of the MI radio communications.

It is an object of the present invention to provide a method and device for increasing the range of a MI radio system.

SUMMARY

In accordance with one aspect of the present invention, a magnetic induction (MI) repeater is provided. The MI repeater comprises first and second coils configured to have the same resonance frequency and to be substantially isolated from one another, and an amplifier connected to the first and second coils and configured to receive a signal induced in the first coil by a first magnetic field and output, via the second coil, a second magnetic field based on the signal, wherein the second magnetic field is amplified relative to the first magnetic field.

In accordance with another aspect of the present invention, a system comprising first and second devices, each having at least one coil and each configured to communicate using magnetic induction (MI), and an MI repeater is provided. The MI repeater comprises first and second coils configured to have the same resonance frequency as one another and to be substantially isolated from one another, and a first amplifier connected to the first and second coils and configured to receive a first signal induced in the first coil by a first magnetic field output by the first device and output, via the second coil, a second magnetic field based on the first signal so as to induce a second signal in the coil of the second device, wherein the second magnetic field is amplified relative to the first magnetic field.

In accordance with still another aspect of the present invention, a method of operating a magnetic induction (MI) repeater is provided. The MI repeater includes an amplifier connected to first and second coils that are substantially isolated from one another and are configured to have substantially the same resonance frequency. The method comprises providing to the amplifier a first signal induced in the first coil by a first magnetic field; amplifying the first signal; and outputting, via the second coil, a second magnetic field based on the first signal, wherein the second magnetic field is amplified relative to the first magnetic field.

BRIEF DESCRIPTION OF THE DRAWINGS

Embodiments of the present invention will be described with reference to the accompanying figures, in which.

DETAILED DESCRIPTION

Broadly, the present invention provides a repeater device which will receive and re-transmit the received MI signal, thereby increasing its range, without substantially modifying the signal.

According to one aspect, the present invention provides a method of extending the range of a magnetic induction radio system, wherein a magnetic induction repeater is provided.

According to another aspect, the present invention provides a medical device system, including at least two devices which communicate using MI radio, wherein the system further includes a MI repeater device.

According to another aspect, the present invention provides a MI repeater, including a receiver coil, a transmitter coil, and an amplifier, the signal induced in the receiver coil being amplified by said amplifier, wherein the transmitter coil and the receiver coil are arranged to be highly isolated.

The present invention may accordingly be employed to extend the range of the MI system, using a device which can be manufactured in a relatively simple, compact form.

The present invention has particular application to medical devices in which MI radio is conventionally used, for example hearing aids, cochlear implants, and the like. However, it will be understood that the underlying principle is applicable to any situation where MI radio can be applied.

The illustrative implementation of the present invention is a MI radio repeater having substantially the same input and output frequency. The repeater works as a transparent device; the MI signal may be unmodified, for example not demodulated or modulated. This means that it only repeats the incoming signal as a copy of the original.

The illustrative implementation may be applied to extend the communication range of a MI peripheral, for example a remote control or microphone with a MI transmitter. It may also be used to facilitate communication between a MI device placed, for example, on a bedside table and an antenna or array of antennas integrated (for example) into a bottom sheet of a bed or pillow. The repeater may also be employed to act as a buffer or amplifier, or hub, for a bilateral hearing prosthesis. Further possible applications include acting as a sniffer/monitor during a wireless fitting session, acting as a MI antenna splitter, or providing a power link (for example if there is no data stream) in order to charge the implantable battery, for example via the MI antenna array in a pillow.

For magnetic induction radio, the quasi-static near field is used and the majority of energy is stored in the non-propagating magnetic field itself. Near-field and reactive-near field transmissions using multi-turn or single turn loop antennas can be modelled using transformer theory, although power transfer is very weak or almost inexistent. The information is coupled by the medium through the time varying magnetic field. The coupling between transmit and receive coils is very small.

The magnetic near field of a MI system has a fast roll-off behaviour of $1/r^3$. The power generated by the induced RX voltage in a load rolls-off with $1/r^6$. Therefore it is useful to place a repeater between two devices with limited communication range.

Figure 1A:
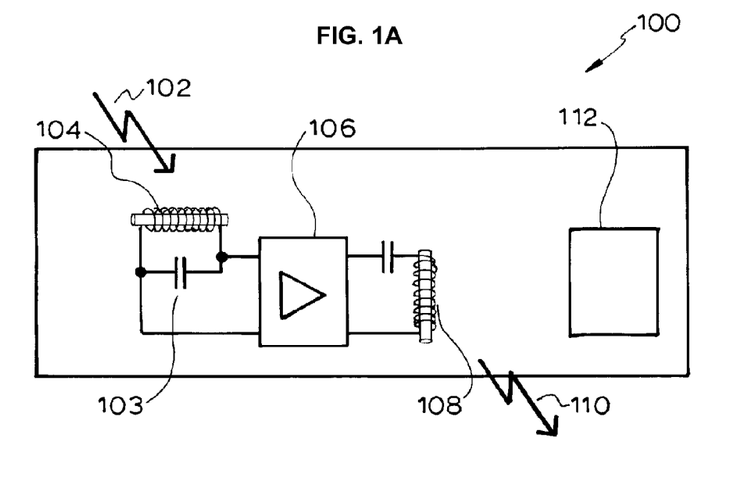
FIGS. 1A and 1B are schematic diagrams of embodiments of the present invention.

The repeater device according to the present implementation of the invention (control, programming and data streaming) is based on some basic principles/methods, which can be readily understood with reference to FIG. 1A.

A magnetic field (H) 102 induces a voltage over a first coil 104 (Faraday's law). The field 102 is the MI signal transmitted by some other component of the system (not shown). Coil 104 is referred to as the receiver or RX coil.

A coil has an induced voltage that is proportional to the change of magnetic flux. This is Faraday's law, which in Maxwell's equations is written as:

$$\nabla \times E = -\frac{\partial B}{\partial t} \quad (1.1)$$

where E=electric field [V/m], and B=magnetic flux density [Tesla or Weber/m$^2$]

In the case of an electrical wire or coil, a voltage e(t) is generated when the magnetic flux, $\Phi'$, enclosed by that electrical wire or coil, changes.

$$e(t) = -N \cdot \frac{d\Phi}{dt} \quad (1.2)$$

where e(t)=induced voltage or electromotive force [Volt] or [energy/unit charge], N=number of turns, and $\Phi$=magnetic flux [Weber].

The voltage output of the RX coil 104, across a suitable capacitor 103, is presented to an amplifier 106. A suitable voltage controlled amplifier 106, for example a trans-conductance amplifier as shown in FIG. 1A, converts the induced voltage signal to a current signal. The output current is then passed to a second coil 108, which then generates an 'amplified' magnetic field (see, Ampere's circuital law and Biot-Savart law). This coil is referred to as the transmission or TX coil 108. Accordingly, an amplified form of the received, induced signal is produced. The repeater 100 is powered by a power supply 112. The 'amplified' magnetic field in the form of a MI outgoing signal 110 is transmitted by the repeater 100 to a remote device (not shown).

Figure 1B:
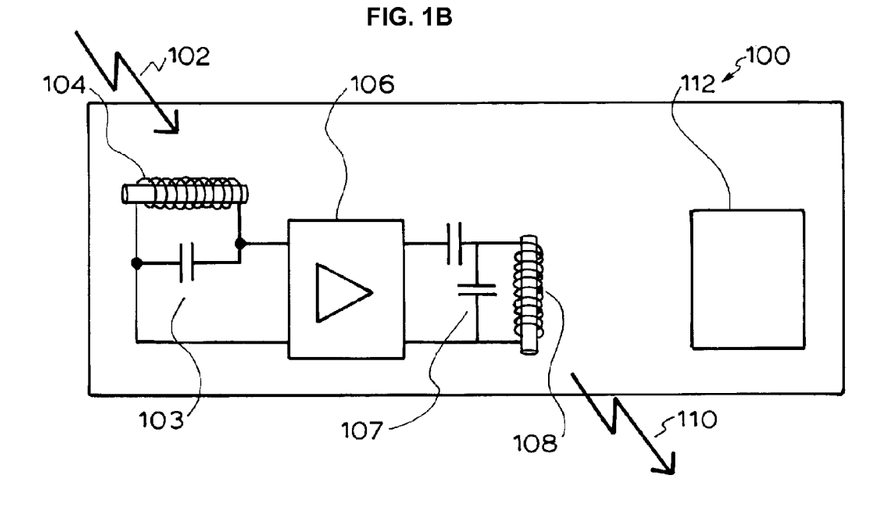

The amplifier of FIG. 1B differs from that of FIG. 1A as amplifier 106 of FIG. 1B converts the induced voltage applied at its input to an output voltage signal passed over a capacitive divider 107 to a second coil 108.

In order to avoid oscillation, the amplifier gain needs to be smaller than or equal to the isolation between the RX coil 104 and TX coil 108.

Figure 2A:
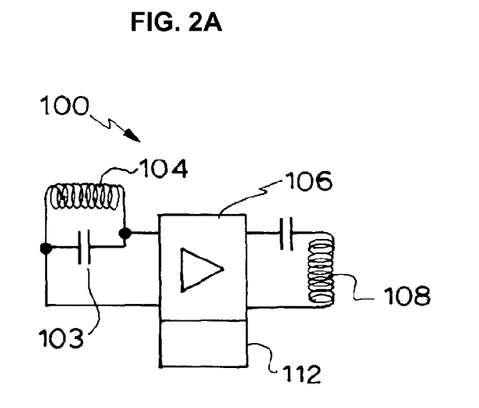
FIG. 2A is a schematic diagram of an embodiment of the present invention having an orthogonal coil arrangement.
Figure 2B:
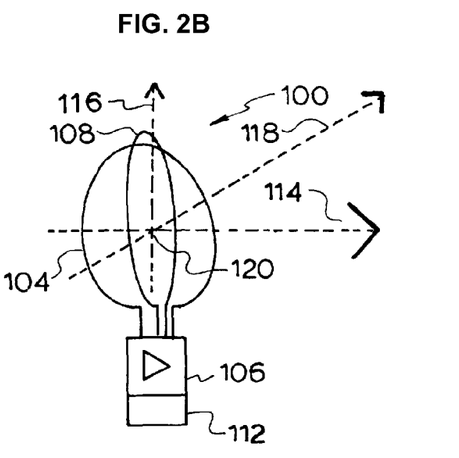
FIG. 2B illustrates a practical implementation of the embodiment of FIG. 2A.

FIG. 2A illustrates a schematic diagram simple implementation of a repeater 100 with an orthogonal coil arrangement. FIG. 2B illustrates a practical implementation of the embodiment of FIG. 2A. TX coil 108 and RX coil 104 have the same center 120 on the X-axis 114, Y-axis 116 and Z-axis 118, and are arranged orthogonally to each other (TX coil 108 in the plane formed by the Y-axis 116 and the Z-axis 118, and RX coil 104 in the plane formed by the X-axis 114 and Y-axis 116, as shown in FIG. 2B).

Figure 3A:
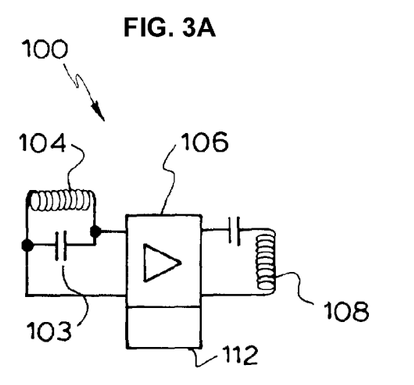
FIG. 3A is another schematic diagram of an embodiment of the present invention having an orthogonal coil arrangement.
Figure 3B:
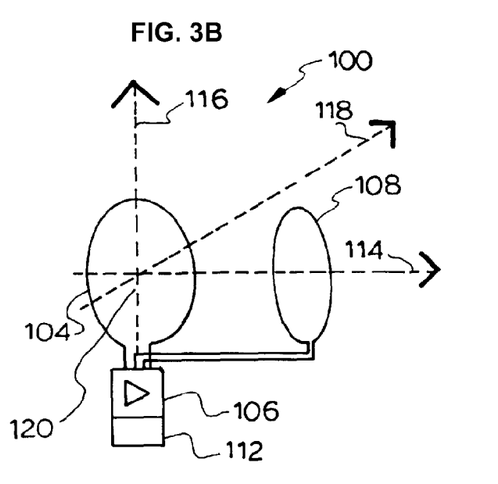
FIG. 3B illustrates a practical implementation of the embodiment of FIG. 3A.

FIG. 3A is a schematic diagram of another implementation of a repeater 100 with an orthogonal coil arrangement, and FIG. 3B illustrates a practical implementation of the embodiment of FIG. 3A. By drawing a virtual axis or line crossing the centers of the RX coil 104 and TX coil 108 (e.g. X-axis 114), a very high isolation can be obtained when the windings of RX and TX coils 104, 108 are placed in orthogonal oriented planes with the virtual axis or line belonging to a first orthogonal plane (e.g. the plane of the RX coil windings 104) and the virtual axis as normal line (perpendicular) to a second orthogonal plane (e.g. the plane of the TX coil windings 108). Theoretically the isolation of optimal orientated and located coils is infinite. However, practically, coil imperfections will limit the isolation and thus the related permissible gain.

If the centers of RX coil 104 and TX coil 108 are not placed on the same axis, the geometrical shape and dimensions will define the rotation angle between the windings which has the highest isolation. It can be proven that for any point in space a rotation angle can be found having an infinite isolation between RX coil 104 and TX coil 108. RX and TX coils 104, 108 may be placed parallel to each other (plane-parallel on the same axis), with amplification 106 provided in between, with the RX and TX coils 104, 108 adequately spaced from each other. Since the magnetic field drops with the third power over distance, the amplifier 106 can compensate for the magnetic field attenuation.

Figure 4A:
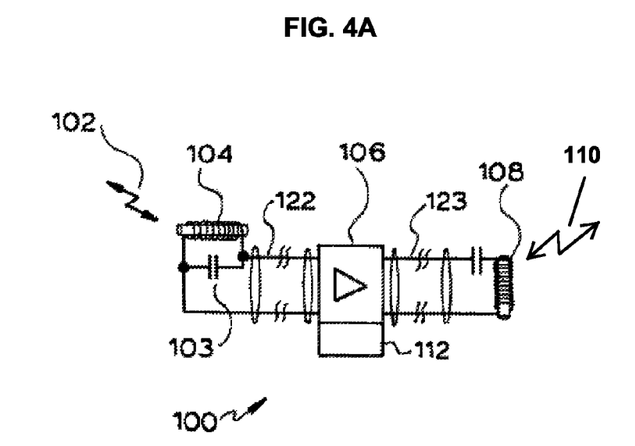
FIG. 4A is a schematic diagram of an alternative implementation with RX and TX coils adequately spaced from each other.
Figure 4B:
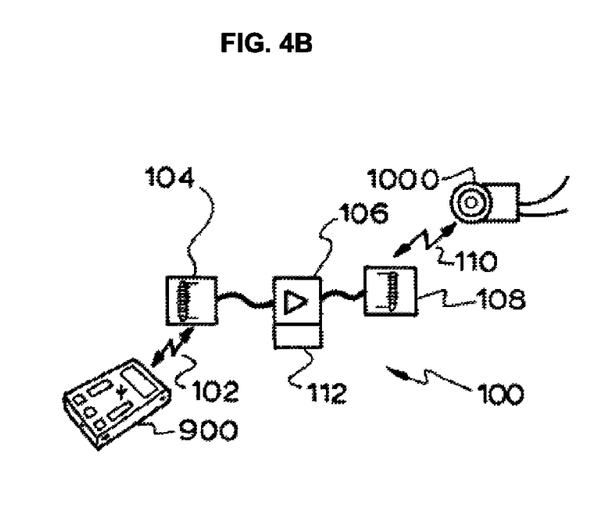
FIG. 4B illustrates a practical implementation of the embodiment of FIG. 4A.

FIG. 4A is a schematic diagram of an implementation of this type, and FIG. 4B illustrates a practical implementation of the embodiment of FIG. 4A. As shown in the diagram, the MI signal 102 may be received from a Remote Control Unit 900, the RX coil 104 is separated from amplifier 106 by feeder line 122, and similarly the amplifier 106 is separated by feeder line 123 from TX coil 108. The RX coil 104 is separated from the amplifier 106 by a 30 cm cable and the TX coil 108 is separated from the amplifier 106 by a 120 cm cable. The amplified MI signal 110 can be transmitted, for reception by other devices (e.g. by a cochlear implant 1000).

In order to maximise the efficiency of the repeater, the RX and TX coils should be placed in resonance. Using capacitors in combination with the coils will create LC tank circuits to achieve this. The resonance may be either series or parallel resonance.

Appropriate capacitive or inductive tapping may be employed to obtain the most appropriate repeater characteristics.

The coils may be formed in any conventional way. They could be formed of one or multiple windings, without or with ferromagnetic or ferrimagnetic core material. A repeater setup as described above can be used for uni- or bi-directional communication links on the same frequency.

Two orthogonal coils made of 20 copper windings each having a diameter of 10 mm is a very suitable antenna system for a compact repeater working at 10 MHz. Using a ferrite core having a relative permeability of 100 could practically reduce the winding diameter by a factor of 10 or more.

The detection of the presence of a MI signal by RSSI (Radio Signal Strength Indication) could activate the amplifier, in order to minimise power consumption. Such a detection circuit could also be used to determine the direction of communication (uplink/downlink) in case of an implementation having common RX/TX coils or amplifiers, as will be explained below with reference to examples. In a preferred implementation, the resonance frequencies of the RX and TX coils are the same. A complete bidirectional repeater including common antennas can then be made very compactly.

A repeater amplifying electromagnetic (EM) wave signals on a common frequency with high gain could easily oscillate due to an unstable transmission path loss. If the path loss becomes equal to or lower than the gain of the amplifier, oscillation readily occurs. Such instability in signal path loss could be caused by reflections (multi-path), conduction or absorptions by objects or persons in the vicinity, or other wave propagation related factors. Therefore, the RX and TX antenna are placed far from each other (typically extended with coaxial cables) for an EM field RF repeater arrangement.

The magnetic fields used for MI (magnetic induction) radio do not suffer from these reflections and instabilities. High isolations are obtained even at short distances by placing the RX and TX coils in mutually orthogonal positions.

Utilizing a MI repeater such as described allows, at its simplest, the range of MI radio systems to be increased. This may be for extending the range of peripheral devices, for example remote controls, microphones, or other elements of the medical device system. It may be used to extend the range for wireless device programming over MI radio. It may assist in enabling communications between the sides of a bilateral hearing prosthesis. It may act as an antenna splitter, and additionally provide links to other wireless or wired systems.

The TX coil or coils of the repeater could provide a power link if there is no data stream, for example to charge the implantable battery where the implantable device includes a battery. In this form, the repeater could be implemented as, for example, a MI antenna array in a pillow or similar arrangement.

The output level of the amplifier can be controlled or limited using an automatic level control (ALC) system. The ALC will reduce the gain of the amplifier where strong incoming signal levels are detected. Incoming signal levels could easily vary from 100 1 aV (microvolt) to 100 mV. This would require a very linear amplifier with a 60 dB dynamic range. An ALC could reduce the dynamic range requirement by 30 dB thereby decreasing the total power consumption of such an amplifier.

Figure 5:
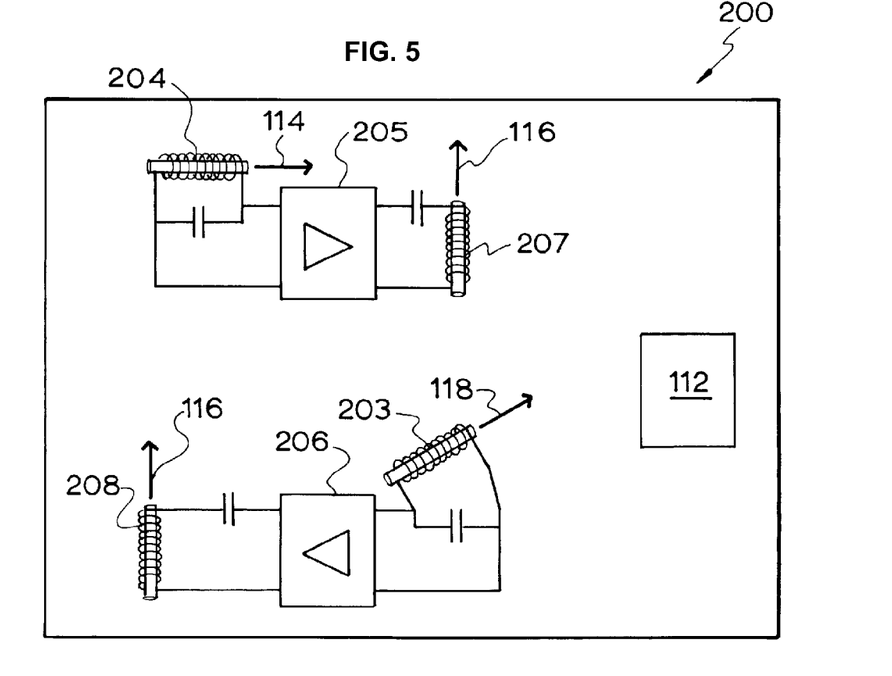
FIG. 5 is a schematic diagram of a bi-directional repeater.

FIG. 5 illustrates a simple bi-directional implementation 200 of the present invention. In this arrangement, a common power supply 112 is used. Separate pairs of RX and TX coils are provided for each direction of communication. In one pair, RX coil 204 is (for example) oriented to the X-axis 114, and RX coil 203 is oriented to the Z-axis 118. Both TX coils 207, 208 are oriented to the Y-axis 116. As such, the RX coils 203, 204 are orthogonal to the TX coils 207, 208, and hence a very high isolation is achieved. There is also orthogonality between each of the coils located at the same side of the repeater 200. This type of arrangement can be employed with either a common or separate operating frequencies.

Figure 6:
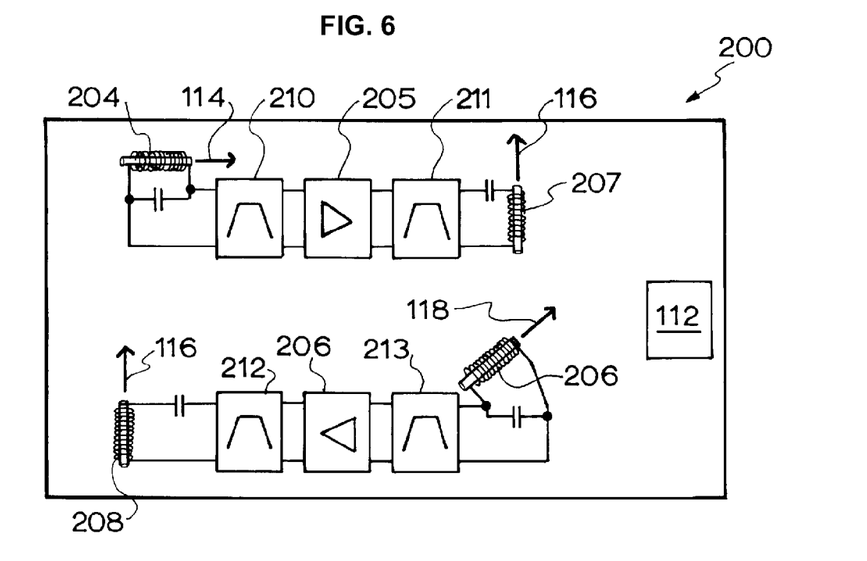
FIG. 6 is a schematic diagram of an alternative bi-directional repeater.

FIG. 6 illustrates an arrangement similar to that of FIG. 5, with a similar orthogonal coil arrangement. However, it uses a more sophisticated amplifier arrangement. In addition to separate amplifiers 205, 206 for each direction, filters 210, 211, 212, 213 are provided for each side of the amplifiers 205, 206. Considering RX coil 204, bandpass filter 210 is provided before the signal reaches amplifier 205. A further bandpass filter 211 is provided between amplifier 205 and TX coil 207.

The bandpass filters are used to improve on frequency channel selectivity of the repeater. A higher selectivity is advantageous if adjacent channels or adjacent frequency interference needs to be filtered out. Filtering the amplifier's output improves also on EMC compatibility. If the uplink and downlink amplifier chain of the repeater operate at different frequency channels, the receiver and transmitter coils of the uplink and downlink could even reside on the same axis.

Figure 7:
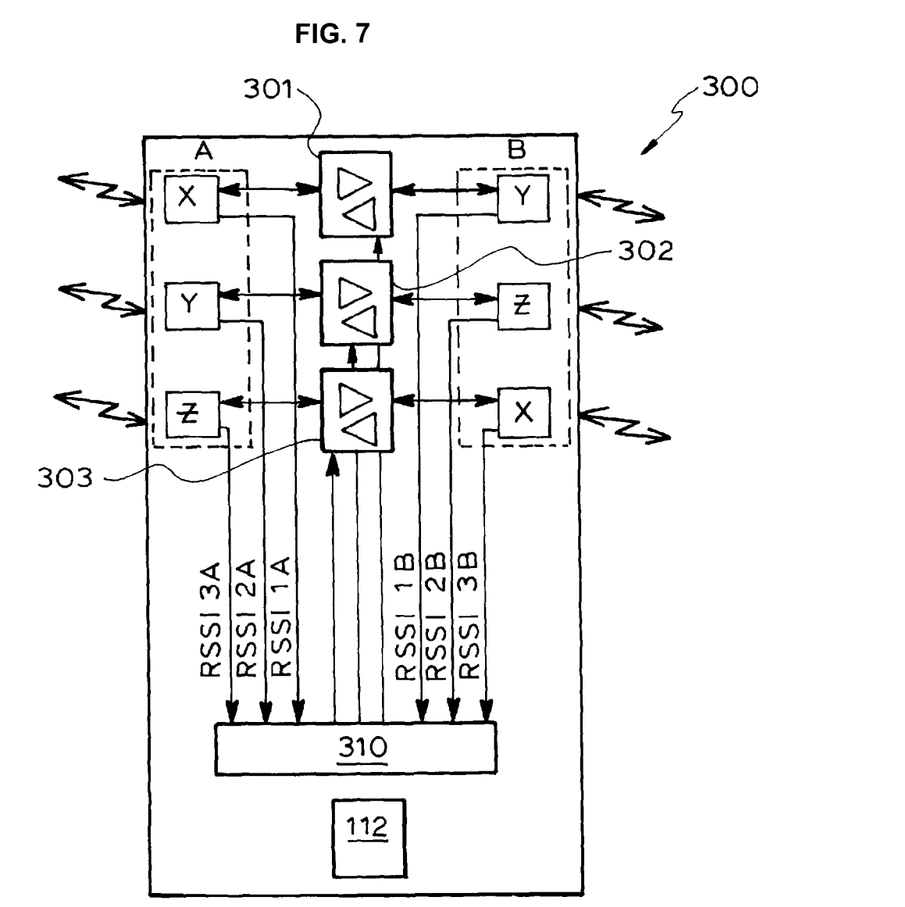
FIG. 7 is a schematic diagram of an alternative structure having two arrays of three coils.

A more complicated basic block diagram of a repeater system 300 is depicted in FIG. 7. Three separate bidirectional amplifiers 301, 302, 303 are provided. There are two separate arrays of mutually orthogonal coils; three orthogonal coils at location 'A', the X-axis coil (X), Y-axis coil (Y) and Z-axis coil (Z) as shown in the figure; and three orthogonal coils at location 'B', the Y-axis coil (Y), Z-axis coil (Z) and X-axis coil (X) as shown in the figure. Locations A and B may be separated by a distance of, for example, one meter. Each amplifier is connected to one coil of each array. The coils connected to a common amplifier are sufficiently isolated from each other (orthogonally or at large distance). In the absence of magnetic field signals, all six coils are potentially RX coils and monitored by RSSI (Radio Signal Strength Indication) circuitry (RSSI monitoring shown in the figure as RSSI1A, RSSI2A, RSSI3A, RSSI1B, RSSI2B, and RSSI3B).

Logic circuitry 310 (for example, BI-CMOS, TTL) is provided to decide which amplifier 301, 302, 303 is activated for a detected signal, and in which direction it is operating. The decision process is preferably based on the RSSI level. When a RSSI threshold is reached, the respective amplifier is activated and the signal is amplified to the opposite location. The respective RX coil at the opposite location will convert temporarily to a TX coil. Under this arrangement, a maximum of three coils could operate in transmission mode simultaneously.

Figure 8:
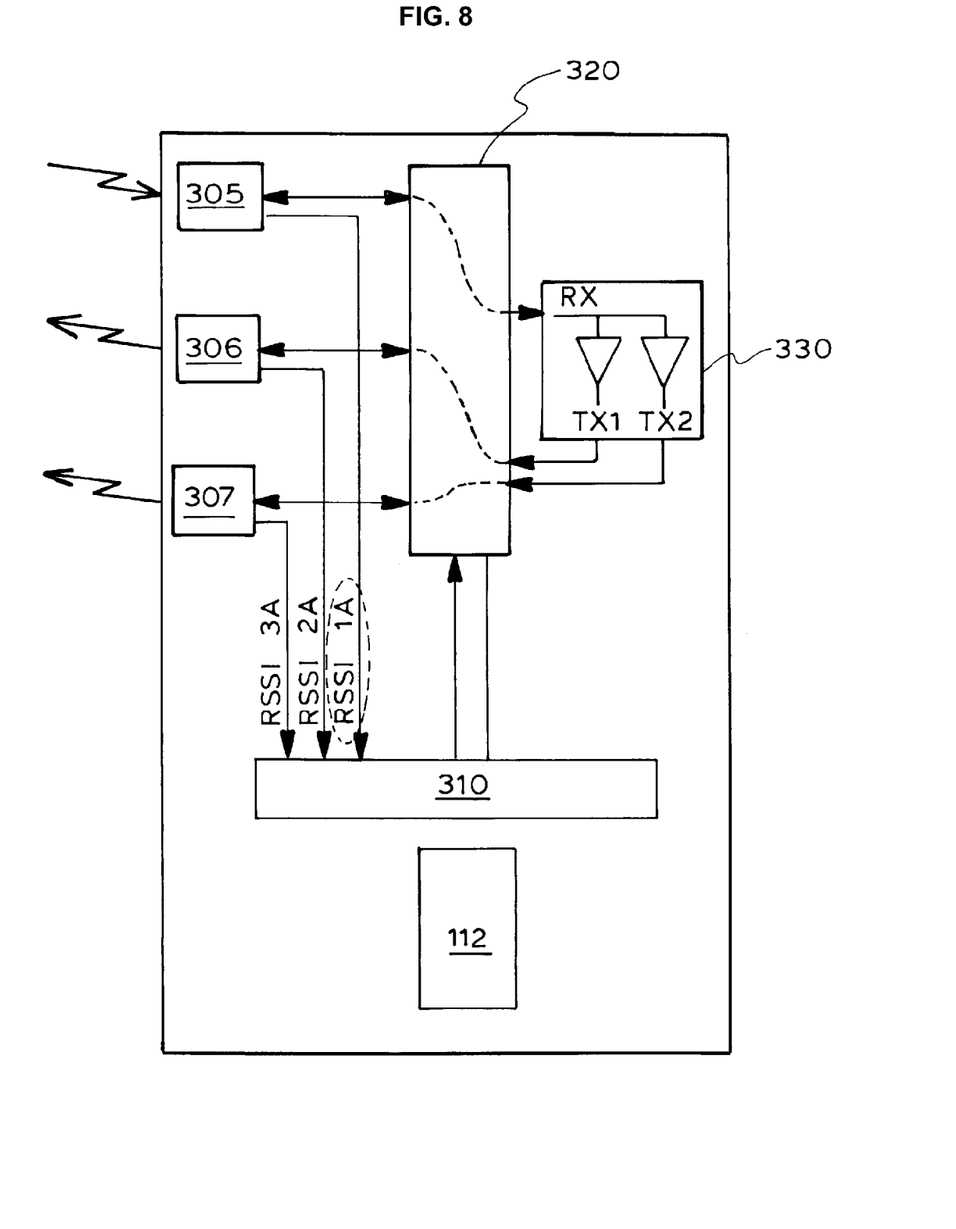
FIG. 8 is a schematic diagram of another alternative structure in which 3 orthogonal coils are used to provide TX and RX using switches.

FIG. 8 illustrates another alternative implementation, in which a single coil array (having, for example, a X-axis coil 305, a Y-axis coil 306, and a Z-axis coil 307) is shared by two directional amplifiers 330. Each orthogonal coil 305, 306, 307 in the array can be used for TX or RX as required, with coil selection (for example, through a coil selection matrix 320) made by logic circuitry 310 similarly to that of FIG. 7. In the absence of magnetic field signals, all three coils are potentially RX coils and are monitored by RSSI circuitry. When a RSSI threshold is reached on one of the RX coils (for example RSSI1A monitoring the X-axis coil 305), the two amplifiers 330 are activated and the signal is amplified to the other two coils 306, 307. The two other RX coils 306, 307 will convert temporarily to TX coils.

A maximum of two coils could operate in transmission mode simultaneously under this arrangement. The repeater amplifier can be connected to the different coils with an RF feeder cable (over short or long distances).

Figure 9:
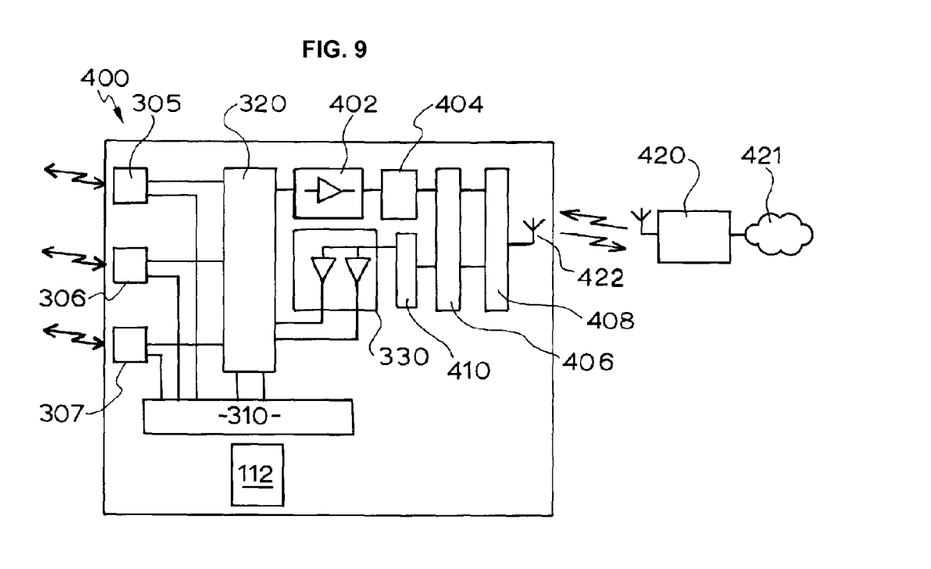
FIG. 9 is a schematic diagram of another variation, in which connectivity with other communication systems based upon electromagnetic wave propagation may be provided.

FIG. 9 illustrates a MI repeater arrangement 400 with extension towards other communication systems 420 based upon electromagnetic (EM) wave propagation, for example Bluetooth®. The other communication systems 420 may be optionally connected to a network 421. The MI radio front-end is very similar to FIG. 8, but has an extension to an EM based communication system 420. EM based communication systems such as Bluetooth®, Wibree, a wireless LAN, cellular network (GSM) or other such system providing additional connectivity using peer-to-peer, ad-hoc or network configurations using a proprietary or non-proprietary RF protocol. The MI receiver amplifier 402 is connected via demodulator 404 to a processing and buffering stage 406, which in turn outputs to a wireless interface 408, for example Bluetooth®, Wibree, a wireless LAN, cellular network (GSM), or other such system. Similarly, signals can pass from the wireless EM based communication system 420, via an antenna 422 and interface 408, and processing and buffer stage 406, to modulator 410 and then to the MI transmitter amplifiers 330.

Figure 10:
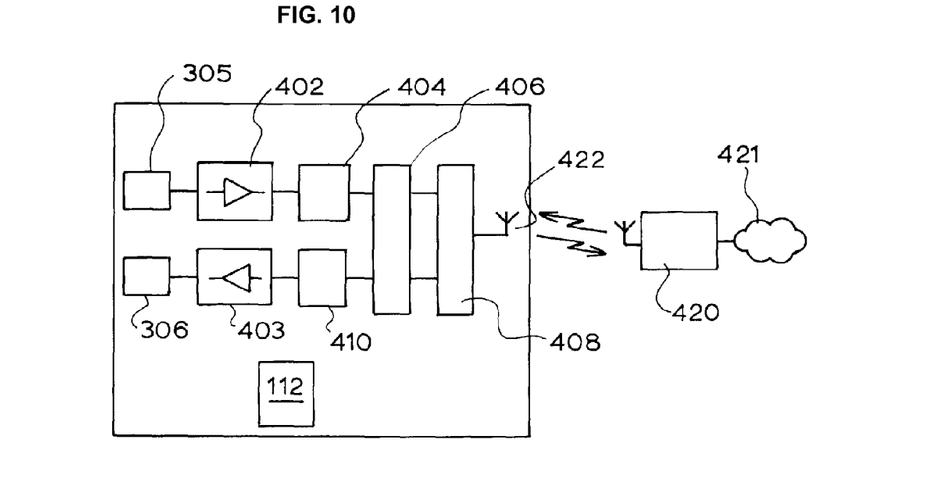
FIG. 10 is a schematic diagram of another variation in which connectivity with other communication systems based upon electromagnetic wave propagation may be provided.

FIG. 10 illustrates another arrangement, in which bi-directional MI communications can occur with extended wireless connectivity to EM based communication systems 420 such as Bluetooth®, Wibree, a wireless LAN, cellular network (GSM), or other such system. Coils 305, 306 are oriented to the X-axis and Y-axis respectively and are hence mutually isolated. Receiver amplifier 402 is connected via demodulator 404 to the processing and buffering stage 406 and then to the wireless network interface 408. Similarly, incoming signals from the external network pass via the modulator 410 to transmitter amplifier 403 to transmitter coil 306. It is noted that whilst the examples refer to wireless RF connections, the repeater could equally be connected to a wired connection, if it is to be used in a fixed location.

The repeater can be powered in any suitable way, for example by battery or mains power.

It will be understood that the repeater could be a separate device, or integrated within some component of the medical device system.

The invention described and claimed herein is not to be limited in scope by the specific preferred embodiments herein disclosed, since these embodiments are intended as illustrations, and not limitations, of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims. Additionally, a person skilled in the art could use one or more features of the examples described above in any compatible combination or permutation.

The invention claimed is:

1. A magnetic induction (MI) repeater comprising:
   first and second coils configured to have the same resonance frequency and to be substantially isolated from one another; and
   an amplifier connected to the first and second coils and configured to receive a signal induced in the first coil by a first magnetic field and output, via the second coil, a second magnetic field based on the signal,
   wherein the second magnetic field is amplified relative to the first magnetic field.

2. The repeater of claim 1, wherein the first and second coils are concentric.

3. The repeater of claim 2, wherein the first coil is disposed in a first plane and the second coil is disposed in a second plane orthogonal to the first plane.

4. The repeater of claim 1, wherein the respective centers of the first and second coils are disposed on the same axis.

5. The repeater of claim 4, wherein the first coil is disposed in a first plane and the second coil is disposed in a second plane orthogonal to the first plane.

6. The repeater of claim 1, further comprising:
   a detection circuit configured to activate the amplifier upon detecting the presence of an MI signal via at least one of the first and second coils.

7. The repeater of claim 6, wherein the detection circuit comprises radio signal strength indication (RSSI) circuitry monitoring the first and second coils.

8. A system comprising:
   first and second devices, each having at least one coil and each configured to communicate using magnetic induction (MI); and
   an MI repeater comprising:
      first and second coils configured to have the same resonance frequency as one another and to be substantially isolated from one another; and
      a first amplifier connected to the first and second coils and configured to receive a first signal induced in the first coil by a first magnetic field output by the first device and output, via the second coil, a second magnetic field based on the first signal so as to induce a second signal in the coil of the second device,
      wherein the second magnetic field is amplified relative to the first magnetic field.

9. The system of claim 8, wherein the first amplifier is further configured to receive a third signal induced in the second coil by a third magnetic field and output, based on the third signal, a fourth magnetic field via the first coil, wherein the fourth magnetic field is amplified relative to the third magnetic field.

10. The system of claim 8, wherein the MI repeater further comprises:
    third and fourth coils configured to have the same resonance frequency as one another and to be substantially isolated from one another; and
    a second amplifier connected to the third and fourth coils.

11. The system of claim 10, wherein the MI repeater further comprises:
    radio signal strength indication (RSSI) circuitry configured to monitor the first, second, third and fourth coils;
    logic circuitry configured to activate one or more of the first and second amplifiers upon detection of an MI signal via one of the first, second, third and fourth coils.

12. The system of claim 11, wherein the first coil is disposed in a first plane and the second coil is disposed in a second plane orthogonal to the first plane.

13. The system of claim 12, wherein the first and second coils are concentric.

14. The system of claim 10, wherein the third coil is disposed in a third plane orthogonal to the first plane and the fourth coil is disposed in a fourth plane orthogonal to the second plane.

15. The system of claim 8, wherein second device is a medical device.

16. A method of operating a magnetic induction (MI) repeater including an amplifier connected to first and second coils that are substantially isolated from one another and are configured to have substantially the same resonance frequency, the method comprising:
    providing to the amplifier a first signal induced in the first coil by a first magnetic field; and
    outputting, via the second coil, a second magnetic field based on the first signal using the amplifier, wherein the second magnetic field is amplified relative to the first magnetic field.

17. The method of claim 16, wherein the first and second coils are concentric.

18. The method of claim 17, wherein the first coil is disposed in a first plane and the second coil is disposed in a second plane orthogonal to the first plane.

19. The method of claim 16, further comprising:
activating the amplifier upon detecting the presence of an MI signal via at least one of the first and second coils.

20. The method of claim 16, further comprising:
providing to the amplifier a second signal induced in the second coil by a third magnetic field; and
outputting, via the first coil, a fourth magnetic field based on the second signal using the amplifier, wherein the fourth magnetic field is amplified relative to the third magnetic field.

* * * * *